Patented Mar. 30, 1954

2,673,856

UNITED STATES PATENT OFFICE 2,673,856

(HALOACETYL)-THIANAPHTHENES

William S. Emerson, Dayton, Ohio, assignor to Monsanto Chemical Company, St. Louis, Mo., a corporation of Delaware No Drawing. Application October 22, 1951, Serial No. 252,583

5 Claims. (Cl. 260—330.5)

The present invention relates to organic sulfur compounds and deals more specifically with compounds of the thianaphthene series.

The invention provides, as new compositions, (haloacetyl)-thianaphthenes having the formula

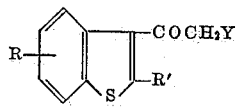

in which Y is selected from the class consisting of chlorine and bromine and R and R' are selected from the class consisting of hydrogen, chlorine, bromine and alkyl radicals of from 1 to 4 carbon atoms. As illustrative of compounds having the above formula and provided by the invention may be mentioned 3-chloroacetylthianaphthene, 3-bromoacetylthianaphthene, 6-chloro-3-chloroacetylthianaphthene, 3-bromoacetyl-4,5-dimethylthianaphthene, 5-bromo-3-chloroacetylthianaphthene, 3-chloroacetyl-6-isopropylthianaphthene, 3-bromoacetyl-2-n-butylthianaphthene, 2-chloro-3-chloroacetyl-4-methylthianaphthene, 2-ethyl-3-chloroacetylthianaphthene, etc.

I have found that the present 3-haloacetylthianaphthene may be prepared by contacting with chlorine or bromine, in the presence of a liquid diluent or solvent, a 3-acetylthianaphthene compound having the formula

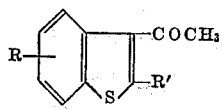

in which R and R' are as herein defined. The 3-acetylthianaphthenes are compounds which are obtainable by the condensation of thianaphthene or the appropriately substituted thianaphthene, i. e., an alkyl-substituted thianaphthene and/or a bromo- or chloro-substituted thianaphthene with acetyl chloride or acetic anhydride in the presence of a Friedel-Crafts type catalyst, substantially according to the method employed by Hansch and Lindwall (J. Organic Chemistry 10 381-5 (1945)) for the preparation of 3-acetylthianaphthene.

Halogenation of the acetylthianaphthenes to yield the present (haloacetyl)thianaphthene compound may be effected by simply passing elemental chlorine or bromine into a solution of the appropriate acetylthianaphthene compound at ordinary or increased temperature until formation of the 3-chloroacetylthianaphthene compound or the 3-bromoacetylthianaphthene compound has occurred. Solvents which may be employed in the halogenation are generally organic solvents for the acetylthianaphthene compound. While, generally, materials which have an affinity for chlorine or bromine are regarded as unsuitable for use as solvents or diluents in halogenation reactions, a solvent possessing limited affinity for halogen may be used to advantage. In the present instance, for example, a mixture of carbon tetrachloride and chloroform may be used. Other solvents or diluents which may be employed include ether, dioxane, nitrobenzene, etc. Generally, no catalysts need be employed; materials which facilitate aromatic halogenation, e. g., iron or aluminum salts should be avoided.

The present (haloacetyl)thianaphthene compounds are well-defined, generally crystalline materials which are advantageously employed for a variety of industrial purposes and are particularly valuable as chemical intermediates in the preparation of compounds having the thianaphthacyl radical as a substituent. As disclosed in my copending application Serial No. 252,582 filed of even date which application is a continuation-in-part of my now abandoned application Serial No. 196,952, filed November 21, 1950, the (haloacetyl)thianaphthenes readily undergo a condensation reaction with alkali metal or ammonium sulfides to yield bis(thianaphthacyl) sulfides which compounds are valuable lubricant additives. Also, as disclosed in the copending application of William S. Emerson and Tracy M. Patrick, Jr., Serial No. 196,951, filed November 21, 1950, the present haloacetylthianaphthenes react with ammonium dithiocarbamate to yield thianaphthyl thiazolyl disulfides of use in the preparation of improved rubber vulcanization accelerators.

The present invention is further illustrated, but not limited, by the following examples:

*Example 1*

Into a mixture of 50 cc. of carbon tetrachloride and 50 cc. of chloroform there was added 17.5 g. of 3-acetylthianaphthene, and chlorine was bubbled into the resulting solution for 5 minutes. During this time there was observed considerable evolution of heat and the formation of a white precipitate. The reaction mixture was then chilled in ice and suction-filtered. Twice repeated crystallization of the precipitate from benzene-hexane gave the substantially pure 3- chloroacetylthianaphthene, M. P. 139.5°–140.5° C., and analyzing as follows:

|              | Found | Calcd. for $C_{10}H_7OCl$ |
|--------------|-------|---------------------------|
| Percent C    | 57.35 | 57.0                      |
| Percent H    | 3.46  | 3.32                      |

Example 2

Chlorine was introduced during a time of 8 minutes into a solution of 17.5 g. of 3-acetylthianaphthene in a mixture consisting of 50 cc. of carbon tetrachloride and 50 cc. of chloroform. The resulting reaction mixture was stirred for 15 minutes, and 50 cc. of hexane was then added to it. After ice-cooling the whole, it was filtered, and the precipitate washed first with 10 cc. of carbon tetrachloride and then with 15 cc. of hexane. There was thus obtained 11.5 g. of the substantially pure 3-chloroacetylthianaphthene. An additional 1.5 g. of the product was obtained from the filtrate by evaporating it to small volume and working it up with hexane and benzene-hexane. The total yield of 3-chloroacetylthianaphthene thus obtained was 62%.

Example 3

Chlorine was passed during a period of 20 minutes into a mixture consisting of 50 g. of 3-acetylthianaphthene, 100 cc. of chloroform and 100 cc. of carbon tetrachloride. The resulting reaction mixture was chilled and worked up as in Example 2 to give an 84% theoretical yield of the substantially pure 3-chloroacetylthianaphthene, M. P. 137°–140° C.

Operating as in the above examples, but using bromine instead of chlorine, 3-acetylthianaphthene may be similarly converted into 3-bromoacetylthianaphthene. Also, instead of employing 3-acetylthianaphthene there may be used a nuclearly chlorinated or brominated 3-acetylthianaphthene to yield the correspondingly nuclearly halogenated 3-(haloacetyl)thianaphthene compound or a nuclearly alkylated 3-acetylthianaphthene in which the alkyl radical has from 1 to 4 carbon atoms to yield the correspondingly nuclearly alkylated 3-(haloacetyl)thianaphthene.

This application is a continuation in part of my application Serial No. 196,952, filed November 21, 1950, now abandoned.

What I claim is:

1. Compounds having the formula

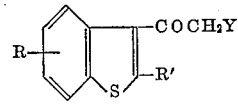

in which Y is selected from the class consisting of chlorine and bromine and R and R′ are selected from the class consisting of hydrogen, chlorine, bromine, and alkyl radicals of from 1 to 4 carbon atoms.

2. 3-chloroacetylthianaphthene.

3. The process which comprises contacting with a halogen selected from the class consisting of chlorine and bromine and in the presence of a liquid diluent a thianaphthene compound having the formula

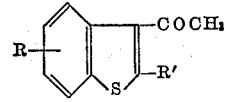

in which R and R′ are selected from the class consisting of hydrogen, chlorine, bromine and alkyl radicals of from 1 to 4 carbon atoms, and recovering from the resulting reaction product a (haloacetyl)thianaphthene compound having the formula

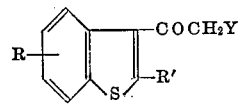

in which Y is selected from the class consisting of chlorine and bromine and R and R′ are selected from the class consisting of hydrogen, chlorine, bromine and alkyl radicals of from 1 to 4 carbon atoms.

4. The process which comprises contacting with chlorine, in the presence of a liquid diluent, a thianaphthene compound having the formula

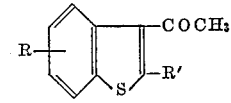

in which R and R′ are selected from the class consisting of hydrogen, chlorine, bromine and alkyl radicals of from 1 to 4 carbon atoms, and recovering from the resulting reaction product a (chloroacetyl)thianaphthene compound having the formula

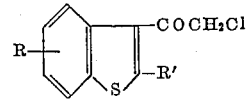

in which R and R′ are selected from the class consisting of hydrogen, chlorine, bromine and alkyl radicals of from 1 to 4 carbon atoms.

5. The process which comprises contacting 3-acetylthianaphthene with chlorine in the presence of a liquid diluent and recovering 3-chloroacetylthianaphthene from the resulting reaction product.

WILLIAM S. EMERSON.

References Cited in the file of this patent

Zubkowski, Chem. Abst., (1930) vol. 24, p. 106.
Randall et al., appl. #62,242, Abstract, 654 O. G., 1152-3-4, Jan. 22, 1952.
Alles, J. Pharm. and Exp. Ther. 72, 265, (1941).
Lands, Proc. Soc. Exp. Biol. Med. 57, 55–56, (1944).
Whitmore, Org. Chem., p. 893, Van Nostrand, N. Y. (1937).
Caesar et al., Ind. Eng. Chem., 40, 922 (1948).